Patented Oct. 28, 1930

1,780,114

UNITED STATES PATENT OFFICE

JEGOR ISRAEL BRONN, OF BERLIN-CHARLOTTENBURG, GERMANY

REFRACTORY MATERIAL AND PROCESS FOR ITS MANUFACTURE

No Drawing. Application filed February 28, 1928, Serial No. 257,779, and in Germany July 15, 1926.

Patent applications have been filed in Germany July 15, 1926, Austria January 30, 1928, Czechoslovakia February 3, 1928, Poland February 8, 1928, Great Britain February 10, 1928.

It has been known for a long time that high grade chromium ore (chromite) is an excellent material for the refractory lining of metallurgical furnaces. Chromium ores are however non-plastic, for which reason they are used as a rule mixed with binding media. The binding media or binders have then a double task:

Firstly, to enable pressed blocks or bricks to be obtained by moulding the raw mixture, which in dried state remain sufficiently durable to enable them to be transported to the burning kiln and to be introduced into the same, and Secondly, to facilitate the sintering of the bricks or blocks during the burning, in order in that way to avoid the use of excessively high temperatures in burning.

As a rule, for binders plastic clays are used, in spite of it having been proved long ago that clays considerably reduce the refractory properties of chromium ores.

It has also heretofore been proposed to use oxides such as magnesia or alumina preferably in combination with lime as binders for chromites, and although particularly burnt magnesite constitutes an excellent binder for chromium ores, and even considerably improves the refractory properties of the ores, yet such mixtures possess the disadvantage that they must be moulded into the form of bricks and subjected to a burning process in order to become usable.

The object of the present invention is to provide a mixture of chromite and binding material which can be used as a highly refractory material without having been previously moulded into brick form and subjected to a burning process, although of course the mixture can also be used in moulded and burnt form. The invention consists in the use of calcium aluminate cement, which is also known as "fused cement", as a binder for chromites in the manufacture of highly refractory masses. To this end small quantities of such cement, which is distinguished from normal Portland cement mainly by a high content of say 40% in alumina, are mixed with the chromite in order to produce an excellent refractory material.

The mixture may be satisfactorily used without any further binders not only as ramming or patching material, but also pressed into bricks or blocks which set very quickly.

The remarkable point here is that the bricks or blocks thus pressed, containing calcium aluminate cement, may be laid or used direct in metallurgical furnaces, without being burnt. The reason for this is probably that the pressed bricks are solidified already before the red heat is reached by the hydraulic properties of the cement, and on the approach of the white heat, by the sintering which then takes place.

It is merely necessary to see that at the first heating up, that is to say at the starting of furnaces lined with such unburnt bricks, the furnace lining should not be exposed to strong mechanical stresses during the transition temperature between the red heat and the beginning of the white heat at which the hydraulic properties of the cement give and the sintering properties have not yet been produced.

As when using cement rich in alumina, relatively small quantities of the cement may be used (in the case of ramming and patching material for instance 10 to 20%, in the case of pressed bricks or blocks 5 to 10%), the proportion of $Cr_2O_3$ in the bricks will only be little reduced thereby, as compared to the chromium oxide of the chromium ores utilized. Thus, for instance, when Jugoslavian chromium ores containing about 48% $Cr_2O_3$ are used with 8% melting cement, bricks or blocks are obtained with 44% $Cr_2O_3$, owing to which the excellent neutral properties of chromium oxide are retained.

What I claim is:—

1. A process for the manufacture of highly refractory material adapted to form solid blocks when heated, consisting in mixing calcium aluminate cement with chromium ore.

2. A process for the manufacture of highly refractory blocks consisting in admixing to iron containing chromium or calcium aluminate cement, moulding the mixture under pressure and burning the moulded blocks.

3. Highly refractory material adapted to form solid blocks on heating comprising a mixture of chromium ore and sufficient calcium aluminate cement to bond the chromium ore.

4. Process for the manufacture of highly refractory material adapted to form solid blocks when heated, which consists in mixing 5-20% of calcium aluminate cement with chromium ore.

5. A process for the manufacture of highly refractory blocks which consists in mixing 5-10% of calcium aluminate cement with iron-containing chromium ore, moulding the mixture under pressure and burning the molded blocks.

6. A highly refractory composition adapted to form solid blocks on heating, comprising a mixture of chromium ore and 5-20% of calcium aluminate cement.

In testimony whereof, I affix my signature.

JEGOR ISRAEL BRONN.